US010967518B2

(12) United States Patent
Neuhaus et al.

(10) Patent No.: US 10,967,518 B2
(45) Date of Patent: Apr. 6, 2021

(54) PRODUCTION SYSTEM FOR THE AUTOMATED ASSEMBLY OF VEHICLE COMPONENTS AND METHOD FOR CONTROLLING A PRODUCTION SYSTEM

(71) Applicant: Airbus Operations GmbH, Hamburg (DE)

(72) Inventors: Frank Neuhaus, Hamburg (DE); Rainer Schildt, Hamburg (DE); Wolfgang Juedes, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 16/245,576

(22) Filed: Jan. 11, 2019

(65) Prior Publication Data
US 2019/0217475 A1    Jul. 18, 2019

(30) Foreign Application Priority Data

Jan. 11, 2018    (EP) .................................. 18151227

(51) Int. Cl.
*B25J 9/16*    (2006.01)
*B64F 5/10*    (2017.01)
(Continued)

(52) U.S. Cl.
CPC .......... *B25J 9/1694* (2013.01); *B23P 21/004* (2013.01); *B25J 9/1687* (2013.01); *B64F 5/10* (2017.01);
(Continued)

(58) Field of Classification Search
CPC ... B23P 21/004; B23P 2700/50; B25J 9/1687; B25J 9/1694; B64F 5/10; G05B 19/41805; G05B 19/41875
See application file for complete search history.

(56) References Cited

U.S. PATENT DOCUMENTS 5,910,894 A * 6/1999 Pryor ................ G05B 19/41875
219/121.64
6,292,715 B1 * 9/2001 Rongo ................... B25J 9/1664
318/568.1
(Continued)

FOREIGN PATENT DOCUMENTS

EP      2 424 780 A2    3/2012
EP      3 249 482 A1    11/2017
WO   WO 2010/125172 A2   11/2010

OTHER PUBLICATIONS

Schwake et al., "Robot-based system for handling of aircraft shell parts," Conference on Assembly Technologies and Systems Procedia CIRP, vol. 23, pp. 104-109 (2014).
(Continued)

*Primary Examiner* — Chad G Erdman
(74) *Attorney, Agent, or Firm* — Jenkins, Wilson, Taylor & Hunt, P.A.

(57) ABSTRACT

A production system for automated assembly of vehicle components, in particular for automated assembly of structural components of an aircraft or spacecraft. The production system includes vehicle components with status sensors that can determine status data of the respective vehicle component, positioner units to grip the respectively associated vehicle component at mounting points and move the respectively associated vehicle component into an assembly position, a position-measurement system to determine the assembly position of each vehicle component, force sensors to determine at least one of reaction forces and moments of each gripped vehicle component at the mounting points in the assembly position, and a computer-based control system in data communication with the vehicle components, the positioner units, the position-measurement system and the force sensors, and configured to control the positioner units based on determined status data, the determined assembly (Continued)

positions and the determined reaction forces and moments of the vehicle components.

11 Claims, 3 Drawing Sheets

(51) Int. Cl.
*B23P 21/00* (2006.01)
*G05B 19/418* (2006.01)

(52) U.S. Cl.
CPC . *G05B 19/41805* (2013.01); *G05B 19/41875* (2013.01); *B23P 2700/50* (2013.01)

(56) References Cited

U.S. PATENT DOCUMENTS

| | | |
|---|---|---|
| 9,132,924 B2 | 9/2015 | Stark et al. |
| 2014/0157588 A1 | 6/2014 | Boyd et al. |
| 2015/0202824 A1* | 7/2015 | De Mattia ........... B29C 67/0011 264/299 |
| 2015/0344154 A1 | 12/2015 | Larson et al. |
| 2016/0074926 A1 | 3/2016 | Hunt et al. |
| 2019/0080524 A1* | 3/2019 | Tucker ............... G05B 23/0283 |

OTHER PUBLICATIONS

European Search Report for Application No. 18151227.8 dated Jun. 1, 2018.
European Office Action for Application No. 18151227.8 dated Mar. 25, 2020.

* cited by examiner

PRODUCTION SYSTEM FOR THE AUTOMATED ASSEMBLY OF VEHICLE COMPONENTS AND METHOD FOR CONTROLLING A PRODUCTION SYSTEM

CROSS-REFERENCE TO RELATED APPLICATION

This application claims priority to European Patent Application EP 18 151 227.8 filed Jan. 11, 2018, the entire disclosure of which is incorporated by reference herein.

TECHNICAL FIELD

The disclosure herein pertains to a production system for the automated assembly of vehicle components and a method for controlling such a production system. The disclosure herein particularly pertains to a production system for the automated assembly of structural components of an aircraft or spacecraft and a method for controlling such a production system.

BACKGROUND

Although generally applicable to the assembly of any kind of vehicle or vehicle component, in particular large components of landborne, airborne, or waterborne vehicles, the disclosure herein and the problem on which it is based will be explained in greater detail with reference to the fuselage assembly of commercial passenger aircraft.

The fuselage shell of a modern aircraft consists of metal or composite material, e.g. carbon fiber reinforced plastics (CFRP), formed as a rigid framework of stiffening elements that is covered by a skin. The framework normally comprises a series of frames bent into a circumferential direction according to the shape of the fuselage cross section and a plurality of longitudinal stringers or longerons that are joined to the frames. A typical fuselage shell is divided in the longitudinal direction into shell sections, each of which may individually be assembled from smaller shell portions. For example, a fuselage aft section of a fuselage shell may be assembled by circumferentially adjoining two side shell portions (including window openings), a lower shell portion and an upper shell portion to form a circumferential shell, and by closing off this circumferential shell in the aft direction with a single smaller tapering tail section.

The assembly of such shell sections or other large structural components, as for example passenger floors, cargo floors, etc., out of smaller shell portions is usually managed by positioning the individual aircraft components relative to each other within an iterative process using a plurality of positioner units that grip and move the aircraft components. To this end, the positioner units may be supported by an automated positioning system, which in turn may include a measurement system, e.g. a laser tracking system. However, the final control in this iterative process is commonly still in the hand of a human operator. For example, the human operator may have to intervene in the automatic positioning process in case one component leaves predefined system boundaries of the positioning system. Such system boundaries may for example be defined by the acceptable limits on the reaction forces on the aircraft components in the mounting points of the positioner units indicating the allowable residual stresses in the aircraft components. The assembly system may provide information on the reaction forces and the current positions of the aircraft components. Based on this information the operator may initiate, e.g. after an automatic stop due to exceedance of a reaction force limit, another positioning attempt following an alternative trajectory. As a consequence, there is a need for further automatizing the whole positioning process (cf., for example, US 2016/0074926 A1, US 2015/0344154 A1 and US 2014/0157588 A1).

SUMMARY

Against this background, it is an object of the disclosure herein to find solutions for improving the automated assembly of large vehicle components.

This object is achieved by a production system and a method for controlling a production system having features disclosed herein.

According to a first aspect of the disclosure herein, a production system for the automated assembly of vehicle components is provided. The production system comprises vehicle components being provided with or comprising status sensors, each status sensor being configured to determine status data of the respective vehicle component. The production system further comprises positioner units being configured to grip the respectively associated vehicle component at mounting points and move the respectively associated vehicle component into an assembly position. The production system further comprises a position-measurement system being configured to determine the assembly position of each vehicle component. The production system further comprises force sensors being configured to determine at least one of reaction forces and moments of each gripped vehicle component at the mounting points in the assembly position. The production system further comprises a computer-based control system being in data communication with the status sensors of the vehicle components, the positioner units, the position-measurement system and the force sensors. The computer-based control system is configured to control the positioner units based on the determined status data, the determined assembly positions and the determined reaction forces and moments of the vehicle components.

According to a second aspect of the disclosure herein, a production system for the automated assembly of vehicle components is provided. The production system comprises vehicle components each being provided with or comprising a data storage implemented in the vehicle component, the data storage being configured to store status data and identification and configuration data of the respective vehicle-component. The production system further comprises positioner units being configured to grip the respectively associated vehicle component at mounting points and move the respectively associated vehicle component into an assembly position. The production system further comprises a position-measurement system being configured to determine the assembly position of each vehicle component. The production system further comprises force sensors being configured to determine at least one of reaction forces and moments of each gripped vehicle component at the mounting points in the assembly position. The production system further comprises a computer-based control system being in data communication with the data storages of the vehicle components, the positioner units and the position-measurement system. The computer-based control system is configured to control the positioner units based on the status data and the identification and configuration data, the determined assembly positions and the determined reaction forces and moments of the vehicle components.

According to a third aspect of the disclosure herein, a method for controlling a production system for the automated assembly of vehicle components is provided. The method comprises gripping each vehicle component with respectively associated positioner units at mounting points. The method further comprises moving each vehicle component with the respectively associated positioner units into an assembly position. The method further comprises determining the assembly position of each vehicle component with a position-measurement system. The method further comprises determining at least one of reaction forces and moments of each gripped vehicle component with force sensors at the mounting points in the assembly position. The method further comprises determining status data of each vehicle component with status sensors provided at each vehicle component. The method further comprises communicating data between a computer-based control system and the status sensors of the vehicle components, the positioner units, the position-measurement system and the force sensors. The method further comprises controlling the positioner units with the computer-based control system based on the determined status data, the determined assembly positions and the determined reactions forces and moments of the vehicle components.

According to a fourth aspect of the disclosure herein, a method for controlling a production system for the automated assembly of vehicle components is provided. The method comprises gripping each vehicle component with respectively associated positioner units at mounting points. The method further comprises moving each vehicle component with the respectively associated positioner units into an assembly position. The method further comprises determining the assembly position of each vehicle component with a position-measurement system. The method further comprises determining at least one of reaction forces and moments of each gripped vehicle component with force sensors at the mounting points in the assembly position. The method further comprises determining status data and identification and configuration data from a data storage implemented in each vehicle component. The method further comprises communicating data between a computer-based control system and the data storages of the vehicle components, the positioner units, the position-measurement system and the force sensors. The method further comprises controlling the positioner units with the computer-based control system based on the determined status data and identification and configuration data, the determined assembly positions and the determined reactions forces and moments of the vehicle components.

One idea of the disclosure herein is to provide and improve an automated assembly of large vehicle components, in particular structural aircraft components, through networking between positioner units, which are used to hold the vehicle components and bring them into an assembly position, and the vehicle components themselves. In particular in aircraft construction, individual vehicle components with complex geometrical shapes may have to be carefully oriented in three-dimensional space with respect to each other, which puts high demands on the positioning process. Due to the characteristics of the manufacturing process of the vehicle components, these parts (e.g. CFRP-components) may be formed in a highly individual fashion. Even in cases where these parts are standardized according to computer-aided design (CAD) or finite element methods (FEM) or similar means, deviations may occur to some extend due to process fluctuations, out of tolerance issues, raw material aspects, assembly processes and so on, e.g. in case a shell portion is pre-equipped with frames and/or stringers deviations may occur. Thus, CAD- or FEM-data, as they are used in more conventional production systems, do not always necessarily provide a perfect representation of the 'real' configuration of the respective vehicle component. Any additional knowledge about the 'real' and current physical configuration of the vehicle components, e.g. geometry, physical statuses like stresses or strains, state of readiness etc., may be helpful in the production process to further optimize handling of the components during assembly.

The introduction of interactive networking between the production system components provides the advantage that the positioning process may be controlled and optimized by a computer-based system in an 'online' fashion, which can relieve, complement, or even replace human operators conventionally involved in the production process. To achieve this, the disclosure herein provides a production system, wherein the relevant system components are in data communication with a controlling computer system and, thus, also with each other. To this end, the production system components as well as the vehicle components may have a certain level of information processing capabilities besides a certain bandwidth of data communication capabilities. To complement the positioner units, sensor systems are provided in data communication with the computer system such that the status of the positioner units and the gripped vehicle components may be determined at any point in time. As a result, the production system according to the disclosure herein forms a so-called cyber-physical production system, which is a production system composed of physical entities, i.e. a physical production system of vehicle components, positioner units and sensors and so on, controlled and monitored by a computer-based control system. Due to the data link between the physical entities and the computer system, advanced computer-based algorithms may be employed to control, regulate, steer, and/or optimize aspects of the assembly process. On top of this, the vehicle components themselves can provide status data acquired through their respective status sensors, which then may be taken into account during positioning of the components (i.e. "online").

The production system according to the disclosure herein provides a measurement system for determining the current position of the vehicle components in three-dimensional space, i.e. not only a three-dimensional coordinate of certain reference points may be provided but also the orientation of the component within three-dimensional space may be taken into account. Reaction forces and/or moments of each gripped vehicle at their mounting points are assessed by force sensors and are communicated to the control system. Furthermore, status data of the vehicle components are assessed by status sensors and are communicated to the control system. The mechanical loads, stresses, strains and so on of each vehicle component may thus be analyzed at any point in time and based on this and the current position of the vehicle components the control system may prompt the positioner units to move the vehicle components. Hence, a self-optimizing, semi- or fully-autonomous assembly system may be fashioned even for the assembly of large and complex structural components of aircraft and/or spacecraft.

According to the disclosure herein, a vehicle component may be gripped and moved by one single positioner unit or by several such units in unison. For example, a large elongated fuselage portion of a passenger aircraft may be gripped by several positioner units arranged along the component's longitudinal axis. These positioner units are thus mechanically coupled through the vehicle component to be positioned. A single positioner unit may be provided with one or several gripping means, e.g. gripper arms or similar, and may thus grip and/or hold the vehicle components at several mounting points at the same time.

The production system and method according to the disclosure herein improve and stabilize production quality, in particular for large and complex and, as the case may be, highly individual vehicle components. Lead time and production costs for all process steps may be reduced significantly. The production system according to the disclosure herein provides an integrated, intelligent, digitally organized production process, wherein the physical components of the production system may be intelligently interlinked with each other and with the vehicle components. These provisions provide huge advantages over conventional production systems where vehicle components remain mostly passive and are not actively involved in the system, e.g. by providing status information during assembly in an online fashion as in the disclosure herein. Even though some conventional systems employ digitally representations of the vehicle components, e.g. in the form of CAD- or FEM-models, typically no active feedback from the components via sensors is taken into account. In the disclosure herein all structural components of aircraft, e.g. fuselage shells, boxes, wings, vertical tail planes, fuselage sections etc., may be integrated in a production system as active components in a digital environment such that status information of these components may be used in-situ to support an autonomous and self-optimizing production and assembly process.

According to an embodiment of the disclosure herein, the production system may be configured for the automated assembly of structural components of an aircraft or spacecraft. The method may thus be used to assemble structural components of an aircraft or spacecraft.

According to an embodiment of the disclosure herein, the computer based control-system comprises a multi-agent system including positioner agents. The computer based-control system may be configured to actively control each positioner unit via an associated positioner agent. Each positioner unit may thus be actively linked to an associated positioner agent. The positioner agents may particularly be provided as software agents. Today, networking technology is widely available in industry. However, information processing capabilities of current production system components are rather limited with respect to computing power and data access to central or distributed sources as product model data and process planning data. Further, certain members in the processing chain may not have any data processing capabilities at all, e.g. product or vehicle components that need to be involved in the communication network of a production system. In order to resolve this lack, a digital representation of the production system may be provided in order to create a flexible communication channel between all relevant production system components through a digital representation. The digital representation may be composed of virtual representatives of the relevant components of the physical production system. Each virtual production system component may be linked to its physical counterpart in order to receive or send information to each other. In order to (self-)optimise the production process by exchanging and processing information, the communication and information processing may be performed in the digital representation. For that purpose, each virtual production system component may be represented as a software agent within a multi-agent system. Optionally, data access to databases may also be realized through the communication capabilities of the multi-agent system. Through the communication channel between the physical production system components and the virtual representation, information from the production system component (e.g. sensor values) may be considered for information processing in the linked agents. Actions processed by the agents may be initiated at the physical production system component through the data link as well. Communication between production system components may be performed through communication between the agents. With this technical approach, even legacy production system components with limited data communication bandwidth and information processing capabilities may be transformed into a more sophisticated production system. In sum, the networking between the production system components and in particular between the positioner units may hence be realized through a digitized representation of the assembly system in the form of a multi-agent system.

The multi-agent system may further comprise vehicle-component agents. The computer based-control system may be configured to actively control each vehicle component via an associated vehicle-component agent. Each vehicle component may thus be actively linked to an associated vehicle-component agent. The vehicle-component agents may particularly be provided as software agents. Each vehicle component may be actively linked to the associated vehicle-component agent based on status data as well as identification and configuration data of the respective vehicle component. To this end, identification and configuration data of each vehicle component may be read in by the system in situ, e.g. by a unique ID number via identification tags, e.g., Bar/QR tags, RFID tags, or the like. Based on the unique ID numbers, the identification and configuration data may be provided from a database, AD-data (computer-aided design, CAD) or the like. In addition, the status sensors of the vehicle components provide status data of the vehicle components, which can be retrieved by the computer based-control system through each associated vehicle-component agent. In such an embodiment, even the vehicle-components themselves are integrated into a software representation of the production system as they are provided with networking capabilities. The computer based-control system may actively control the vehicle components via their associated vehicle-component agents. For example, the computer based-control system may prompt the status sensors to read out and/or determine certain status data, e.g. physical parameters of the vehicle component itself or its surroundings.

According to an embodiment of the disclosure herein, each vehicle component may be in data communication with a data storage. The data storage may be configured to store the status data. The data storage may further be configured to store identification and configuration data of the respective vehicle component. The vehicle components may thus be provided with means to link the vehicle components, in particular their status sensors, to an external database, where all the data provided by the status sensors as well further data may be stored. The access to the data storage may be, e.g., a wireless link like Bluetooth, NFC (Near Field Communication) and so on, or a wired connection or any other appropriate means of communication.

The data storage may be implemented in the respective vehicle component. In this embodiment, the vehicle components themselves thus can carry all relevant information. Thus, the vehicle components may be provided with embedded sensors as well as embedded data storage through the complete production process. The data storage may be provided in the form of a readable and/or writeable active data storage, like for example active or passive RFID-chips, SMART-tags, solid state memory's or similar means.

According to an embodiment of the disclosure herein, the status data may comprise at least one of load data, stress data, strain data, structural health data, proximity data and environmental data and the like. Various status data may be incorporated depending on the particular use case at hand:

- global CAD model data corresponding to the individual vehicle component and the actual deviations to a nominal model;
- global static and flexible FEM model data corresponding to the individual vehicle component and the actual deviations to a nominal model;
- global sizing models (stress, static etc.) for the individual vehicle component and the actual deviations to a nominal model;
- predicted weight and actual weight;
- actual assembly status (finished, in progress, open non-conformities etc.);
- information about the datum reference of individual parts (e.g. location of physically embedded reference points etc.);
- measuring reports (3-D and 2-D);
- non-destructive testing reports;
- information from sensors like load cells, structural health monitoring systems, strain or stress gauges, sensors for environmental conditions (e.g. temperature and humidity, UV or IR radiation, salinity etc.) and others which can be embedded in the vehicle component itself (e.g. intelligent glass fibers embedded in the lay-up of an CFRP panel etc.) or others which can be applied on the surface, embedded planar between layers of CFRP/GLARE or mounted in a pre-drilled hole etc. of a vehicle component;
- drawings (frontier drawings, single parts drawings etc.);
- instructions (technical notes, work instructions, test instructions etc.);
- life cycle data sheets (from manufacturing till end of life);
- relevant information for logistics (handling instructions etc.);
- recycling information (material data sheets etc.);
- and so on.

The data storage may function in general as a "self-updating life data sheet" comprising information about the current physical conditions of the vehicle component, the assembly progress status (outstanding work, remaining working steps etc.), concessions (type, status, localization etc.) and so on. These data may then be used in real time by the production system, that is by the computer-based control system, to improve and speed-up the whole production process.

According to an embodiment of the disclosure herein, the status sensors may comprise at least one of load cells, stress gauges, strain gauges, structural health monitoring sensors, proximity sensors and environmental sensors and the like. The status sensors may be integrated into the vehicle components, e.g. in the form of embedded status sensors, and/or may be applied on the surface of the vehicle components (or placed into a recess, like a pre-drilled hole or the like). The status sensors may be directly coupled with a data storage provided with the vehicle component. Alternatively or additionally, the status sensor may be coupled with an external data base or the like. For example, the status sensors may be configured to assess the current physical condition of the vehicle component. To this end, the status sensor may be formed as an environmental sensor like a temperature sensor (being relevant for many production process steps and/or aspects, e.g. storage time, acclimatization, drilling processes, brittleness of the material, chemical processes like sealing, edge protection, shimming, paint processes etc.) or humidity sensor (being relevant for many production process steps and/or aspects, e.g. chemical processes like sealing, edge protection, paint processes etc.). The status sensors may be configured as stress and/or strain gauges (being relevant for many production process steps and/or aspects, e.g. general handling, twisting, bending, pushing/pulling, gap closing, minimizing built-in stress in general etc.). The status sensors may be configured as proximity sensors to improve transportation and handling during the assembly process, i.e. to minimize gaps between two components or other means. The status sensors may be configured as structural health monitoring sensors to reduce non-destructive-testing (NDT)-efforts, e.g. in the form of acceleration sensors placed on or in the vehicle component for detecting impacts or other damages. For example, in case of a CFRP vehicle component, the component may comprises a plurality of piezoelectric transducers for evaluating impact damages by actuating and sensing elastic wave propagation in the composite structure of the vehicle component. The status sensors may acquire metrology data (measuring reports, any deviation from nominal values etc.). For example, the CFRP-component may notify the computer-based control system that an impact has happened during service. The status data assessed by the status sensors may then be communicate in real time to the computer-based control system.

According to an embodiment of the disclosure herein, the force sensors may comprise load cells or similar being mounted to the positioner units. In one embodiment, the positioner units may for example be equipped with grippers and/or gripper arms, to which the loads cells may be coupled. Each load cell may create an electrical signal whose magnitude is proportional to the force or moment being measured. Different technologies may be used like piezoelectric, hydraulic, pneumatic load cells and so on. The load cells may provide information about forces and/or moments at the mounting points of the vehicle components at the positioner units, which in turn may be employed to correct the position and/or trajectory of one or several vehicle components within three-dimensional space. The force and moment data may be used locally for each associated positioner unit. Alternatively or additionally, the force and moment data may be used globally by exchanging these data in between the positioner units or by globally optimizing the vehicle component position taking into account several or all positioner units at the same time. These data may also be used to either minimize loads, like internal stresses or strains within a component, or to add additional loads that are within the allowed range of a component or several components in order to push parts into the perfect position or to close gaps between two or more parts.

According to an embodiment of the disclosure herein, the position-measurement system may comprise a laser tracker or similar, e.g. a photogrammetry system, laser radar, laser scanner or the like. Laser trackers or tracking interferometers are particularly suited for the assembly of large aircraft components as these instruments are able to precisely measure large objects over a distance of several meters with an accuracy in the submillimeter regime. To this end, a laser tracker may be set up on the ground several meters from the vehicle components with an unobstructed view on them.

According to an embodiment of the disclosure herein, each positioner unit may be controlled according to a deviation of the determined assembly position of the respective vehicle component from a nominal assembly position of the respective vehicle component.

According to an embodiment of the disclosure herein, the positioner units may be collectively controlled to minimize the deviations of the determined assembly positions of the vehicle components from the nominal assembly positions of the vehicle components. Hence, two or more positioner units may be collectively controlled. For example, two or more neighboring positioner units that together hold one large vehicle component may be controlled and steered in cooperation. However, in principle all positioner units of one or several assembly systems may be controlled and optimized jointly as a group. For example, two basically separated assembly systems may interact via the control system such that certain control algorithms optimized and trained on one of the two assembly systems may be utilized also for the other assembly system. It is one of the many advantages of the disclosure herein that all positioner units are data linked to the control system such that the scheduling and execution of the control commands may be solely realized on a software basis within the control system. Thus, no additional or disproportionately high amount of extra effort is required in order to control all positioner units of one assembly system collectively.

According to an embodiment of the disclosure herein, the deviations may be minimized under consideration of the determined status data of the vehicle components and the determined reaction forces and moments at the mounting points of the vehicle components. For example, the automated assembly of major aircraft components composed of CFRP causes certain challenges. Due to the production process of CFRP components, the accuracy of the geometrical shape may feature a wider tolerance band per se such that theoretical positioning data from CAD data or similar may not be sufficient to drive the assembly process. In order to make sure that the residual stresses in the assembled component stay well below certain limits, the positioning may be controlled in order to keep the reaction forces and torques at the mounting points below a certain limit. The final or nominal position of the assembled component may be an appropriate balance between reaction force and positioning accuracy.

According to an embodiment of the disclosure herein, the deviations may be minimized under consideration of the determined status data of the vehicle components and the determined reaction forces and moments at the mounting points of the vehicle components. Using a neural network, the system may 'learn' from former positing activities by creating a self-learning behavioral model of the individual system components, which then may be used for subsequent or future positioning activities to make the appropriate manipulations automatically. The neural network may be trained, for example, based on the input data of an assembly system controlled by a human operator. Alternatively or additionally, the neural network may be trained based on test runs on the basis of predefined vehicle components. Neural networks offer many advantages particularly for complex assembly systems, e.g. involving major aircraft components made of un-isotropic material, as empirical approaches may be employed to determine an appropriate behavioral model. For the setup of a behavioral model based on a neural network, there is no need for an analytical understanding of the physical details involved. A detailed analytical understanding of the involved process may not be practical or not possible at all, as non-linear aspects may determine it. A neural network may however be adapted to such processes by taking the training on the basis of a number of data sets from former positioning activities or training data derived from pre-defined motion sequences. In order to define reusable behavioral models, it may be advantageous to classify the individual positioning situations based on gripping positions relative to the individual vehicle components. For example, the aircraft component may have a much higher local stiffness close to a door opening due to a higher amount of stiffening components (radial structural frames) than on other gripping positions where the aircraft component may be equipped only with axial oriented local stiffeners (stringers). A classified behavioral model with a neural network may be applied as a control instance to correct the nominal positioning trajectory based on the data that is generated during the positioning process, including reaction force vectors, reaction torque vectors, distance vectors between neighboring grippers, reaction force and torque vectors from neighboring grippers, and so on. Based on a suitable classification of positioning situations, behavioral models may be reused on similar positioning situations. Each positioning process could help to improve a suitable defined neural network for any subsequent positioning process up to a theoretical optimum. The classification of a positioning situation may depend on the capability of the positioner unit, e.g. the gripper arm, the gripping area, the degrees of freedom of the positioning unit, etc. Following such an approach, the positioning process may be represented by a control loop. The control component in the loop may be based on a neural network that represents the local system behavior at each individual positioning unit. The system behavior describes the non-linear relation between reaction force vectors, positional deviations, shape deviations, and deviations between nominal and actual gripping positions.

Furthermore a neural network linked with a cyber-physical-system that represents a whole assembly system by several agents may support initial start-up operations of a new assembly station that has been added to the assembly system by using already learned operations from already implemented stations that are performing the same or similar tasks.

Furthermore a neural network linked with a cyber-physical-system that represents a whole assembly system of two or more identical or similar assembly stations by several agents may reduce set-up times and process times by transferring already learned operations between control systems of stations that are performing the same or similar tasks The disclosure herein will be explained in greater detail with reference to exemplary embodiments depicted in the drawings as appended.

BRIEF DESCRIPTION OF THE DRAWINGS

The accompanying drawings are included to provide a further understanding of the disclosure herein and are incorporated in and constitute a part of this specification. The drawings illustrate the embodiments of the disclosure herein and together with the description serve to explain the principles of the disclosure herein. Other embodiments of the disclosure herein and many of the intended advantages of the disclosure herein will be readily appreciated as they become better understood by reference to the following detailed description. The elements of the drawings are not necessarily to scale relative to each other. In the figures, like reference numerals denote like or functionally like components, unless indicated otherwise.

DETAILED DESCRIPTION

Although specific embodiments are illustrated and described herein, it will be appreciated by those of ordinary skill in the art that a variety of alternate and/or equivalent implementations may be substituted for the specific embodiments shown and described without departing from the scope of the disclosure herein. Generally, this application is intended to cover any adaptations or variations of the specific embodiments discussed herein.

Figure 1A:
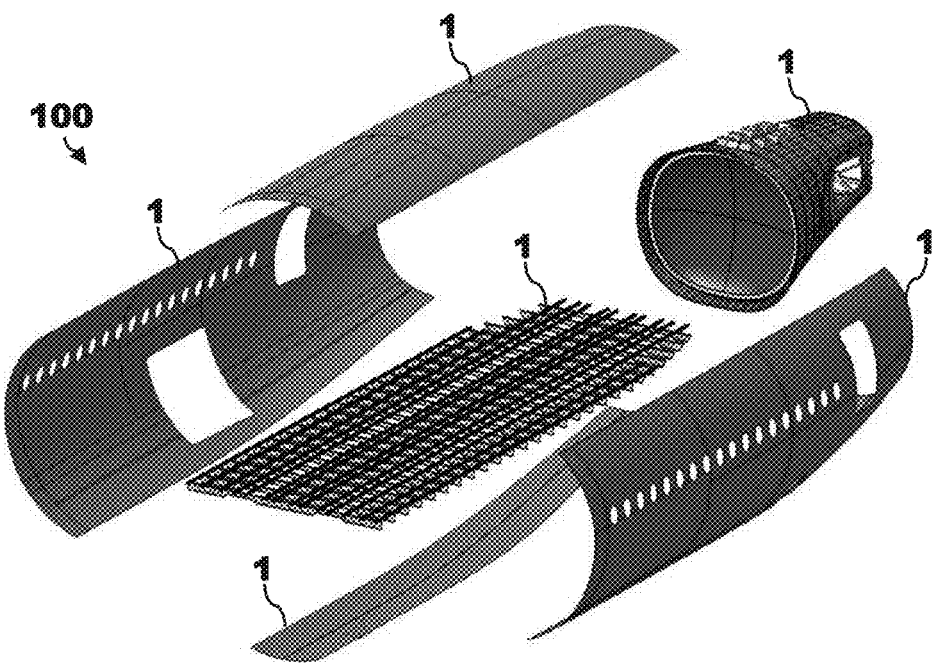
FIG. 1A, 1B schematically show perspective views of the assembly of a fuselage section of an exemplary aircraft (exploded view in FIG. 1A and assembled view in FIG. 1B).
Figure 1B:
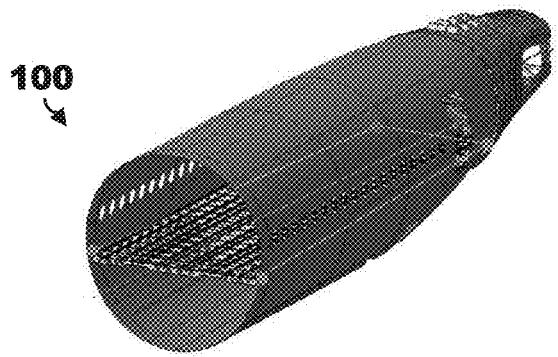

FIGS. 1A and 1B schematically show perspective views of the assembly of a fuselage section of an exemplary aircraft 100, e.g. a commercial passenger aircraft. Specifically, FIG. 1A depicts a fuselage aft section of a fuselage shell of the aircraft 100 in exploded view. The fuselage aft section is assembled from a multitude of smaller vehicle components 1, e.g. made of metal, metal alloy, and/or composite material like CFRP or similar, comprising two side shell portions (including window and door openings), a lower shell portion, an upper shell portion, a passenger floor, and a tapering tail section. The shell portions are circumferentially adjoined around the passenger floor to form a circumferential shell, which is then closed off in the aft direction with the tapering tail section. The assembly of these vehicle components 1 is shown in FIG. 1B. The assembly process may be executed by methods and production systems according to embodiments of the disclosure herein as they will be described in the following. It will be clear to the person of skill however that the method and production system according to the disclosure herein may be used to assemble and manufacture many other types of vehicles or vehicle components that differ in shape or configuration from the depicted examples. For illustration purposes only, FIGS. 1A-4 address the assembly of a passenger aircraft fuselage aft section. In principle, the embodiments of the method and the production system, as they will be described in the following, may be used not only for the assembly of passenger aircraft or sections of passenger aircraft, but also in general applications within the transport industry, e.g. in landborne, waterborne or airborne vehicles. However, the embodiments of the disclosure herein described herein are particularly advantageous for the assembly of large vehicle components 1, in particular structural components of aircraft 100.

Figure 2:
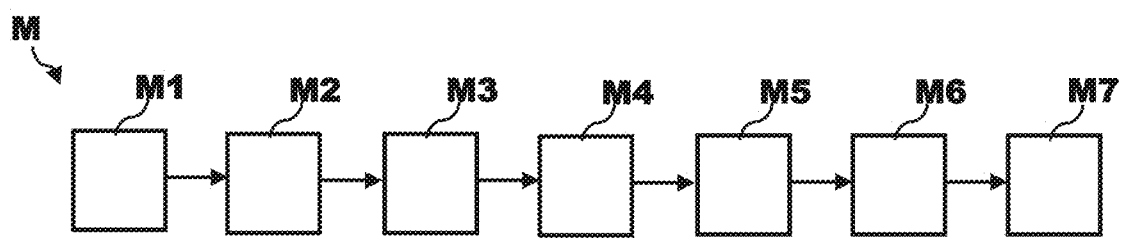
FIG. 2 shows a flow diagram of a method for controlling a production system for the automated assembly of vehicle components according an embodiment of the disclosure herein.
Figure 3:
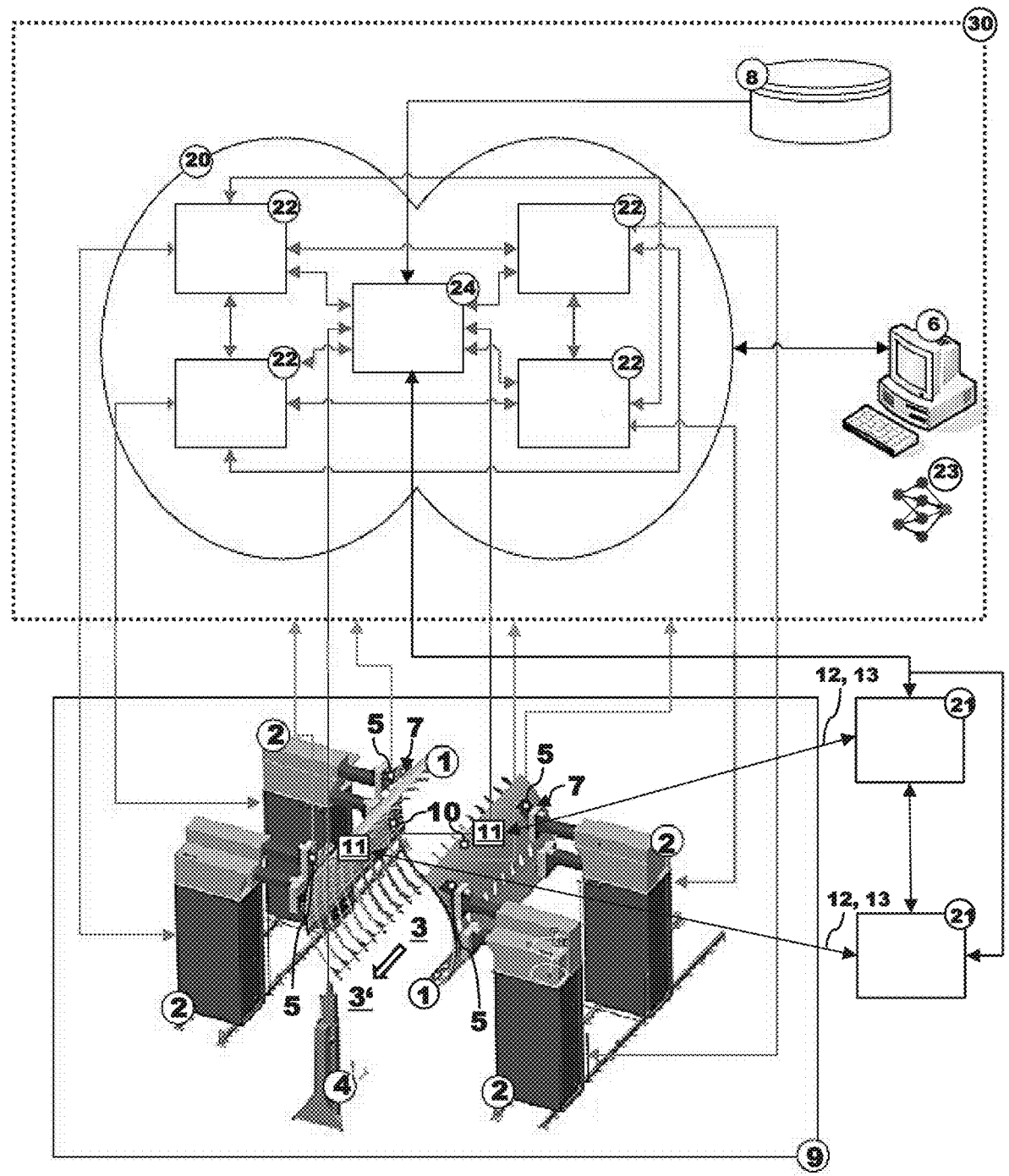
FIG. 3 schematically depicts a production system for the automated assembly of vehicle components according to an embodiment of the disclosure herein as it is used in FIG. 2.

FIG. 2 shows a flow diagram of a method M for controlling a production system 50 for the automated assembly of vehicle components 1 according an embodiment of the disclosure herein. FIG. 3 depicts a production system 50, as it is used in the method M of FIG. 2, for the automated assembly of vehicle components 1 according to an embodiment of the disclosure herein. The method M comprises under M1 gripping each vehicle component 1 with respectively associated positioner units 2 at mounting points 7. For this purpose, each positioner unit 2 is equipped with one or several gripper arms or similar, with which the positioner unit 2 may attach to the vehicle component 1 at a certain mounting point 7 such that the vehicle component 1 may be processed further. A vehicle component 1 may be gripped by one single positioner unit 2 or by several positioner units 2. In the exemplary depiction in FIG. 3, two vehicle components 1 are shown, each of which represents a fuselage side portion of a passenger aircraft, e.g. as the one shown in FIGS. 1A, 1B. Each side portion is gripped by two positioner units 2 arranged along the component's longitudinal axis, so that the positioner units 2 are mechanically coupled via the side portion to be positioned. However, the person of skill will readily acknowledge that many other variations of the arrangement depicted in FIG. 3 are included in the disclosure herein. For example, each vehicle component 1 may equally well be gripped by one single positioner unit 2 or more than two positioner units 2. Each positioner unit 2 may be provided with one or several gripping means, e.g. gripped arms or similar, and may thus grip and/or hold the vehicle components 1 at several mounting points 7 at the same time.

Still referring to FIGS. 2 and 3, the method M further comprises under M2 moving each vehicle component 1 with the respectively associated positioner units 2 into an assembly position 3. To this end, the positioner units 2 may, for example, be mounted on rails that allow to move them into a specific direction. Furthermore, the gripping means of the positioner units 2 may be configured to move into different spatial directions to change the position as well as the orientation, the inclinations, etc., of the vehicle component 1. Like this, the vehicle components 1 may be moved from one assembly position 3 into another assembly position 3', which may be for example a nominal assembly position 3'.

As a further step, the method M comprises under M3 determining the assembly position 3 of each vehicle component 1 with a position-measurement system 4. The position-measurement system 4 may be, for example, a laser tracker or similar tracking interferometer, a photogrammetry system or any other measurement system suited for the use case at hand, i.e. in this case the assembly of large aircraft components. The method M further comprises under M4 determining reaction forces and/or moments of each gripped vehicle component 1 with force sensors 5 at the mounting points 7 in the assembly position 3. The force sensors 5 may mounted on the positioner units 2 next to the mounting points 7 and may be coupled to the grippers or gripper arms. The force sensors 5 may comprise piezoelectric, hydraulic, pneumatic, or mechanical load cells or other suitable means that are able to provide a signal whose magnitude is proportional to the force or moment being measured. The load cells provide information about forces and/or moments at the mounting points 7 of the vehicle components 1 at the positioner units 2. The respective reaction force and moment data can then be used to correct the position and/or trajectory of one or several vehicle components within the spatial dimensions. The force and moment data may be used locally for each associated positioner unit 2 and/or globally by taking into account the respective data of adjacent positioner units 2 or, for example, all other positioner units 2.

Still referring to FIGS. 2 and 3, the method M further comprises under M5 determining status data 12 of each vehicle component 1 with status sensors 10 provided at each vehicle component 1. Each status sensor 10 is configured to determine status data 12 of the respective vehicle component 1. The status data 12 may comprise at least one of load data, stress data, strain data, structural health data, proximity data and environmental data and the like. The status sensors 10 may comprise at least one of load cells, stress gauges, strain gauges, structural health monitoring sensors, proximity sensors and environmental sensors and the like. For example, one or several status sensors 10 may be configured as environmental sensors, e.g. a temperature or humidity sensor, to monitor and secure that the environmental conditions fulfill all possible requirements. In another example, one or several of the status sensors 10 may be configured as proximity sensors to optimize handling during the assembly process and to avoid collisions with other vehicle components 1 and/or other components of the production system 50. One or several of the status sensors 10 may further be configured as structural health monitoring sensors, e.g. in the form of acceleration sensors integrated into the vehicle components 1 for detecting impacts or other damages. One or several of the status sensors 10 may further be configured as load cells, strain or stress gauges or the like to provide information about loads, strains or stress or general forces and/or moments at or within the vehicle components 1, e.g. in particular at the mounting points 7 at the positioner units 2. Due to these provisions, each vehicle component 1 may notify about impacts that have happened during service, acute load overloads and/or critical stresses or strains. The status data 12 assessed by the status sensors 10 may be communicated in real time in order to improve the production process.

Each vehicle component 1 comprises a data storage 11 in communication with the status sensors 10. The data storage 11 is configured to store the status data 12 as well as identification and configuration data 13 of the respective vehicle component 1. Each vehicle component 1 is configured with a certain level of information processing capabilities besides a certain bandwidth of data communication capabilities, that is the vehicle components 1 are configured with networking capabilities. The vehicle components 1 thus not only can carry relevant information for the production process, but furthermore can assess and communicate status data 12 that might be helpful for the production. The data storage 11 may be provided in the form of a readable and/or writeable active data storage, like for example active or passive RFID-chips, SMART-tags, solid state memory's or similar means. The data storage 11 thus may serve as a self-updating data sheet comprising information about the configuration and current physical conditions of the vehicle component 1 as well as the assembly progress status and so on. These data may then be used in real time by the production system 50 to improve and speed-up the whole production process. Alternatively or additionally, the data storage 11 may also be provided outside of the vehicle components 1. In that case, the vehicle components 1 may be provided with a link from the vehicle components 1 to the data storage 11.

In that sense the vehicle components 1 themselves are integrated as 'active components' in the production system 50 in a similar vein as the positioner units 2. The positioner units 2, the position-measurement system 4, the force sensors 5, the vehicle components 1, and so on, form a physical production system 9. The physical production system 9 is embedded into and controlled by a computer-based control system 30. Correspondingly, the method M further comprises under M6 communicating data between the computer-based control system 30 and the vehicle components 1 (including the status sensors 10 and data storages 11), the positioner units 2, the position-measurement system 4, and the force sensors 5. The data exchange itself is illustrated in FIG. 3 by arrows connecting the individual components of the physical production system 9 with the computer-based control system 30. The connection itself may be wireless or cable-based or may rely on any other suitable network and data-exchange technology. The physical production system 9 and the computer-based control system 30 together form a production system 50 in the form of a cyber-physical production system, i.e. a system composed of physical entities, which are controlled and monitored by a computer-based system on basis of computer algorithms. More specifically, the computer-based control system 30 includes a software-based multi-agent system 20 with multiple software agents that interact with corresponding entities in the physical environment. The multi-agent system 20 serves as a digital representation of the physical production system 9. In particular, the multi-agent system 20 of this embodiment includes software positioner agents 22, each of which is actively linked to an associated positioner unit 2. The positioner agents 22 and the positioner units 2 are actively linked in the sense that the computer-based control system 30 may actively control the positioner units 2 via the positioner agents 22 and the positioner units 2 in turn may interact with the computer-based control system 30. For this purpose, the positioner units 2 may have a certain level of information processing capabilities besides a certain bandwidth of data communication capabilities. The multi-agent system 20 further comprises vehicle-component agents 21 that together form the production model 24 of the vehicle (also represented as an agent within the multi-agent system 20), each vehicle component 1 being actively linked to an associated vehicle-component agent 21. A specific vehicle component 1 may be identified by the identification and configuration data 13 stored in its data storage 11. These data may include for example a unique ID number or the like. With this unique ID number, relevant product and configuration data 13 may be assigned to this particular vehicle component 1, which then defines the associated vehicle-component agent 21 used in the digital representation of the multi-agent system 20. For this purpose, the computer-based control system 30 may be connected to a respective database 8 or the like. The vehicle component 1 is hence actively linked to the associated vehicle-component agent 21 in the sense that the vehicle component 1 can be actively controlled by the computer-based control system 30, e.g. status sensors 10 can be read out or controlled and the respective status data 12 can be communicated. In addition, the vehicle component 1 may be controlled or moved by the computer-based control system 30 indirectly via the positioner units 2, which are connected to the respective positioner agents 22.

Moreover, the method M comprises under M7 controlling the positioner units 2 with the computer-based control system 30 based on the determined status data 12, the determined assembly positions 3 and the determined reactions forces and/or moments of the vehicle components 1. More specifically, each positioner unit 2 may be controlled according to a deviation of the determined assembly position 3 of the respective vehicle component 1 from a nominal assembly position 3' of the respective vehicle component 1. Furthermore, several or all positioner units 2 may be collectively controlled to minimize and/or otherwise optimize the deviations of the determined assembly positions 3 of the vehicle components 1 from the nominal assembly positions 3' of the vehicle components 1. In particular, the deviations may be minimized and/or optimized under consideration of the determined status data 12 and the determined reaction forces and/or moments at the mounting points 7 of the vehicle components 1. For this the computer-based control system 30 may include or be connected to a simulation model 6, e.g. based on neural networks 23 that may, for example, represent the behavior of each positioner unit 2 and vehicle component 1.

The improved automated assembly system according to the disclosure herein is based amongst others on the following features: automated assembly optimization through networking between vehicle components 1 and positioner units 2 within a production system 50; realization of networking between vehicle components 1 and positioner units 2 through a digitized representation of the physical production system 9 in the form of a multi-agent system 20; implementing the vehicle components 1 as active components in the assembly system; and assembly optimization via a machine learning process or simulation model, in particular a neural network 23. In conventional assembly or production systems, the decisions for manipulating the positioning process are to a large extend still handled by a human operator. The disclosure herein follows the new approach to let the system "learn" from former positing activities by creating a self-learning behavioral model of individual positioning system components. This behavioral model of the system components can be used for future positioning activities to make the right manipulations automatically. Advance computer algorithms can be utilized within the digital representation of the physical production system 9. Furthermore, the production system 50 will organize a negotiation between the agents in order to find optimized ways for adjusting the shape and position of each individual vehicle component 1 according to preferred parameters or given requirements, e.g. by minimizing deviations from nominal positions while keeping loads, stresses and strains below an upper limit or while optimizing the whole production process for a set of various parameters in order to find the 'best' way for saving and reducing lead time, minimizing built-in stresses, avoiding cracks and local overloads or other assembly problems. The components of the production system 50 may further interact with "smart tools", like for example assembly robots for painting, drilling or the like, such that these are included actively in a self-optimizing multi-agent based control system, wherein the smart tools consider relevant feedback from the vehicle components 1 and the embedded sensors. In this vein many other processes may be transferred and optimized by an appropriate algorithm, like for example manufacturing processes (autoclave cycle, non-destructive testing etc.), assembly processes (drilling, riveting etc.), surface treatment processes (activation, painting etc.), handling processes (internal or external transport etc.), logistic processes (part localization etc.), structural health monitoring or (in-field) repair processes and so on.

Figure 4A:
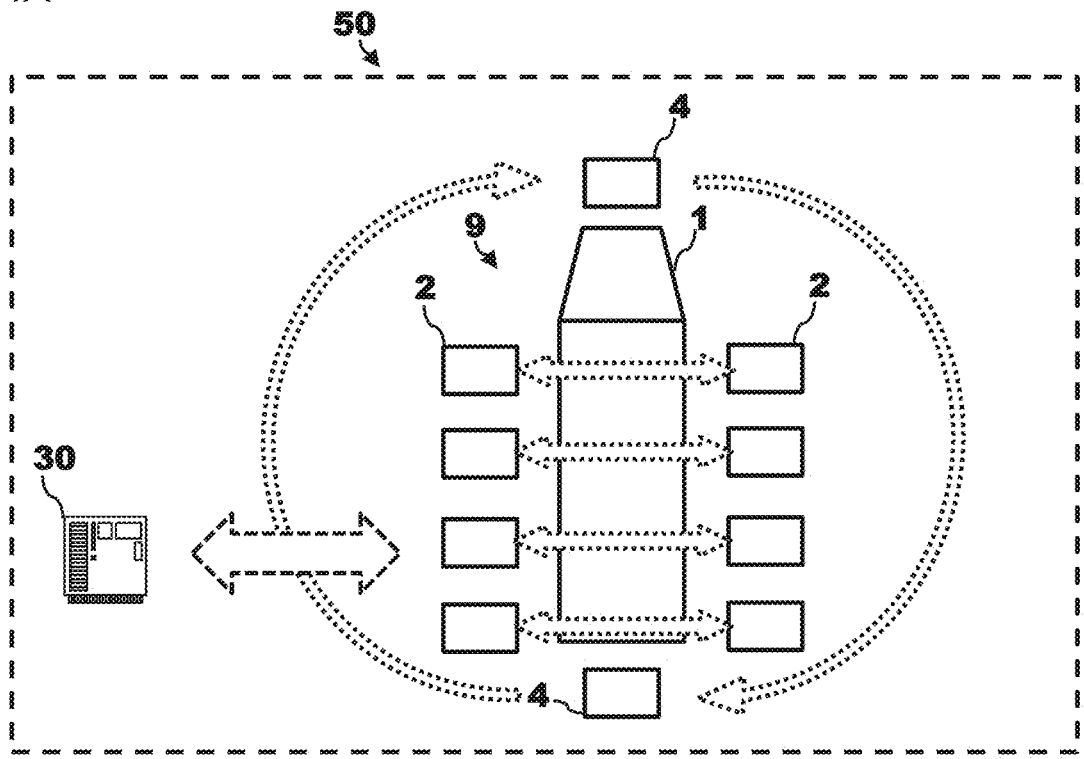
FIGS. 4A, 4B schematically show production systems for the automated assembly of vehicle components according to further embodiments of the disclosure herein.
Figure 4B:
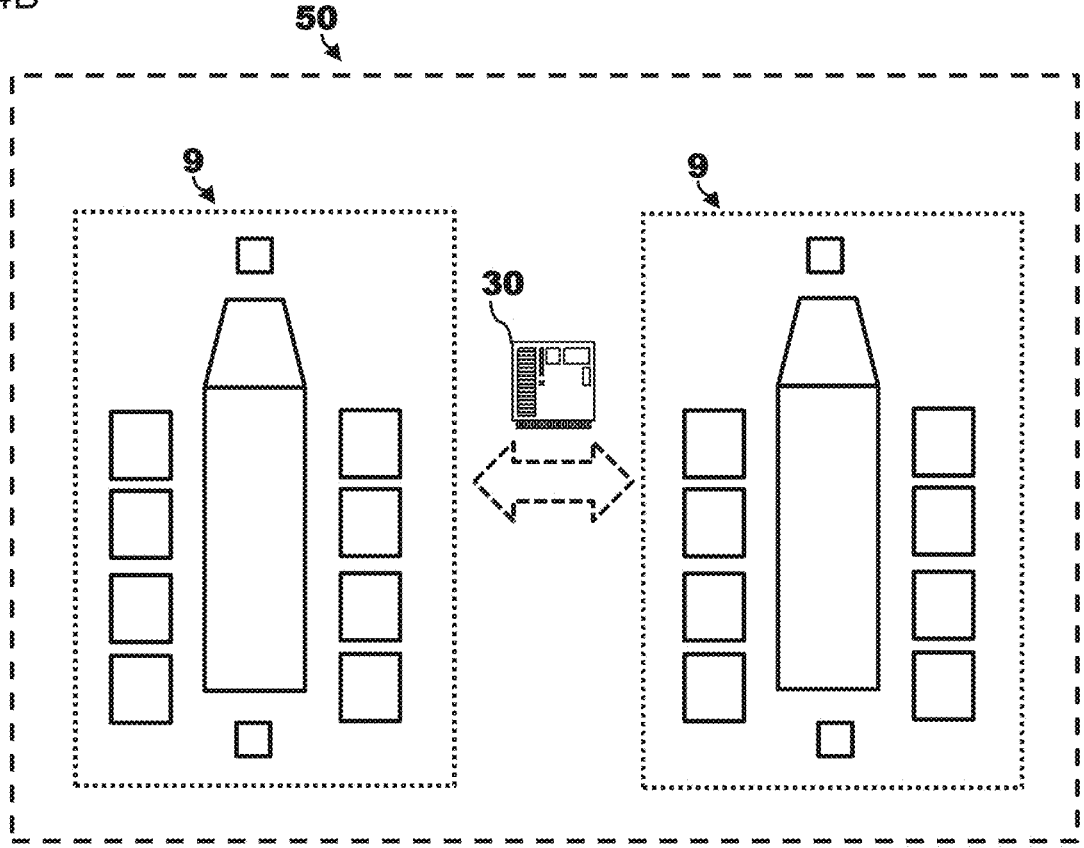

Various modifications and variants of the disclosure herein will be clear to the person of skill. Two examples are given in FIGS. 4A and 4B, which schematically show production systems 50 for the automated assembly of vehicle components 1 according to further embodiments of the disclosure herein. FIG. 4A shows a single assembly system with one physical production system 9 including vehicle components 1, a position-measurement system 4 and positioner units 2, which are controlled by a computer-based control system 30. The vehicle components 1, the position-measurement system 4 and the positioner units 2 interact with each other and with the computer-based control system 30. Based on dedicated machine learning algorithms run on the computer-based control system 30, the production system 50 may learn about the assembly process and optimize the positioning process based on this. FIG. 4B depicts an extended example of this. Here, two physical production systems 9 (e.g. each of them configured as the one in FIG. 4A) are connected with each other and are controlled jointly via the computer-based control system 30. In principle, the individual components of both physical production systems 9 may exchange data directly with each other. Thus, both assembly stations may learn together or individually about the assembly process and optimize the positioning process accordingly.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the disclosure herein and its practical applications, to thereby enable others skilled in the art to best utilize the disclosure herein and various embodiments with various modifications as are suited to the particular use contemplated. Many other examples will be apparent to one skilled in the art upon reviewing the above specification.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 vehicle component
2 positioner unit
3 assembly position
3' nominal assembly position
4 position-measurement system
5 force sensor 6 simulation model
7 mounting point
8 database
9 physical production system
10 status sensor
11 data storage
12 status data
13 identification and configuration data
20 multi-agent system
21 vehicle-component agent
22 positioner agent
23 neural network
24 production model
30 computer-based control system
50 production system
100 aircraft
M method
M1 method step
M2 method step
M3 method step
M4 method step
M5 method step
M6 method step
M7 method step

The invention claimed is:

1. A production system for automated assembly of vehicle components, in particular for automated assembly of structural components of an aircraft or spacecraft, the production system comprising:
vehicle components comprising status sensors, each status sensor configured to determine status data of a respective vehicle component with which each status sensor is associated;
positioner units, each of which is configured to grip at least one vehicle component at mounting points and move the at least one vehicle component into an assembly position;
a position-measurement system configured to determine the assembly position of each vehicle component;
force sensors configured to determine at least one of reaction forces and moments of each vehicle component at the mounting points in the assembly position; and
a computer-based control system in data communication with the status sensors of the vehicle components, the positioner units, the position-measurement system, and the force sensors, the computer-based control system being configured to control the positioner units based on the status data determined by each status sensor, the assembly position of each vehicle component determined by the position-measurement system, and the reaction forces and/or moments of the each vehicle component determined by the force sensors;
wherein the computer-based control system comprises a multi-agent system including positioner agents, the computer based-control system being configured to actively control each positioner unit via an associated positioner agent, and vehicle-component agents, the computer-based control system being configured to actively control each vehicle component via an associated vehicle-component agent.

2. The production system according to claim 1, wherein each vehicle component is in data communication with a data storage, the data storage configured to store the status data and identification and configuration data of the respective vehicle-component.

3. The production system according to claim 2, wherein the data storage is implemented in the respective vehicle component.

4. The production system according to claim 1, wherein the status data comprise at least two of load data, stress data, strain data, structural health data, proximity data and environmental data.

5. The production system according to claim 1, wherein the status sensors comprise at least one of load cells, stress gauges, strain gauges, structural health monitoring sensors, proximity sensors and environmental sensors.

6. The production system according to claim 1, wherein the force sensors comprise load cells mounted to the positioner units.

7. The production system according to claim 1, wherein the position-measurement system comprises a laser tracker.

8. A method for controlling a production system for automated assembly of vehicle components, in particular for automated assembly of structural components of an aircraft or spacecraft, the method comprising:
gripping each vehicle component with respectively associated positioner units at mounting points;
moving each vehicle component with the respectively associated positioner units into an assembly position;
determining the assembly position of each vehicle component with a position-measurement system;
determining at least one of reaction forces and moments of each gripped vehicle component with force sensors at the mounting points in the assembly position;
determining status data of each vehicle component with status sensors provided at each vehicle component;
communicating data between a computer-based control system and the status sensors of the vehicle components, the positioner units, the position-measurement system and the force sensors, wherein the computer-based control system comprises a multi-agent system including positioner agents and vehicle-component agents;
controlling the positioner units with the computer-based control system based on the determined status data, the determined assembly positions and the determined reactions forces and moments of the vehicle components;
actively controlling, using the computer based-control system, each positioner unit via an associated positioner agent; and
actively controlling, using the computer-based control system, each vehicle component via an associated vehicle-component agent.

9. The method according to claim 8, wherein the positioner units are collectively controlled to minimize deviations of the determined assembly positions of the vehicle components from nominal assembly positions of the vehicle components.

10. The method according to claim 9, wherein the deviations are minimized under consideration of the determined status data of the vehicle components and the determined reaction forces and moments at the mounting points of the vehicle components.

11. The method according to claim 9, wherein the deviations are minimized based on a neural network representing behavior of the vehicle components and the positioner units.

* * * * *